March 31, 1970   M. J. SALKOWSKI ET AL   3,504,183
PARTICLE COUNTER USING A VARIABLE TEST VOLUME
Filed Sept. 12, 1966   2 Sheets-Sheet 1
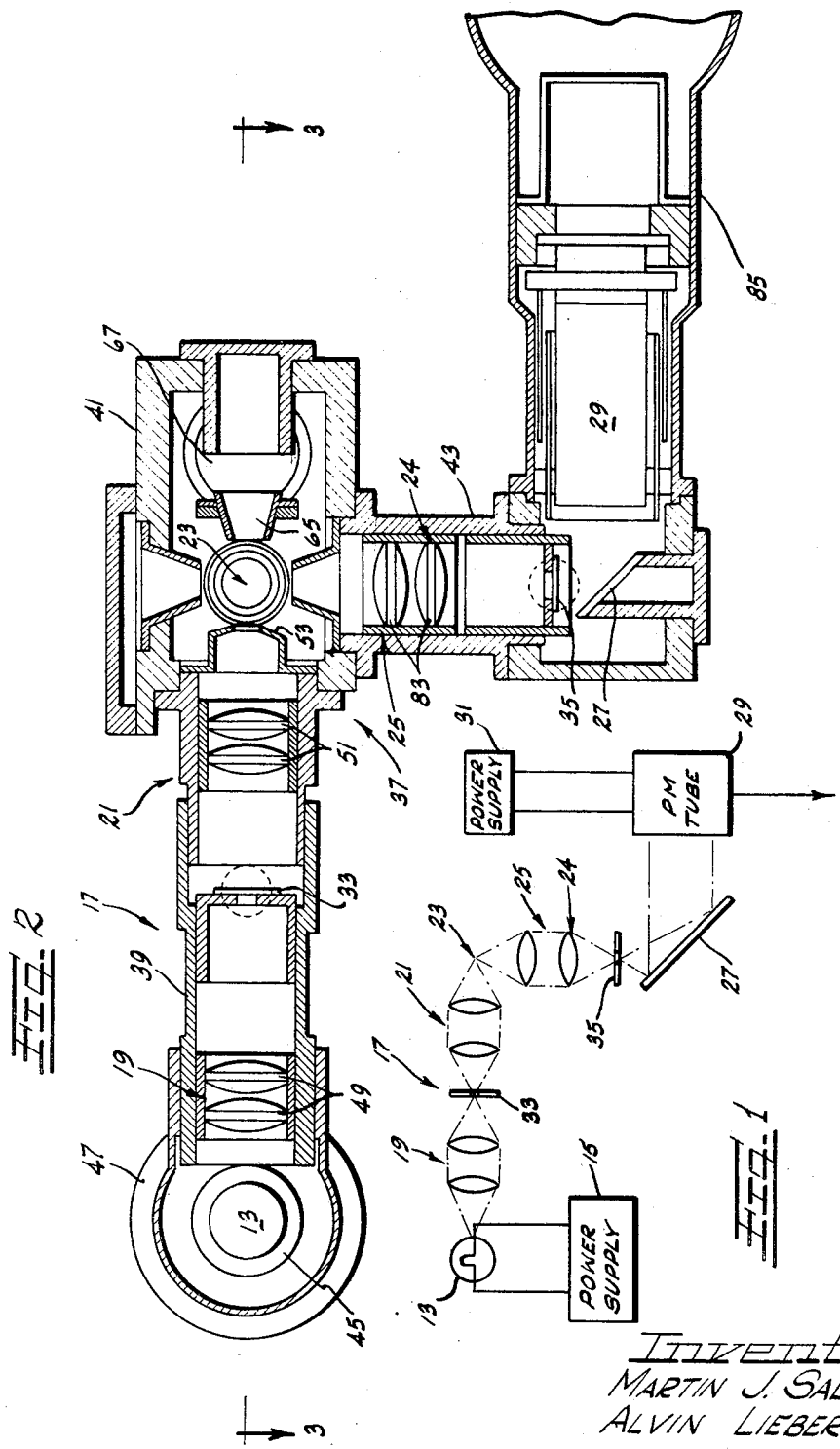
Inventors
MARTIN J. SALKOWSKI
ALVIN LIEBERMAN March 31, 1970 M. J. SALKOWSKI ET AL 3,504,183
PARTICLE COUNTER USING A VARIABLE TEST VOLUME
Filed Sept. 12, 1966 2 Sheets-Sheet 2
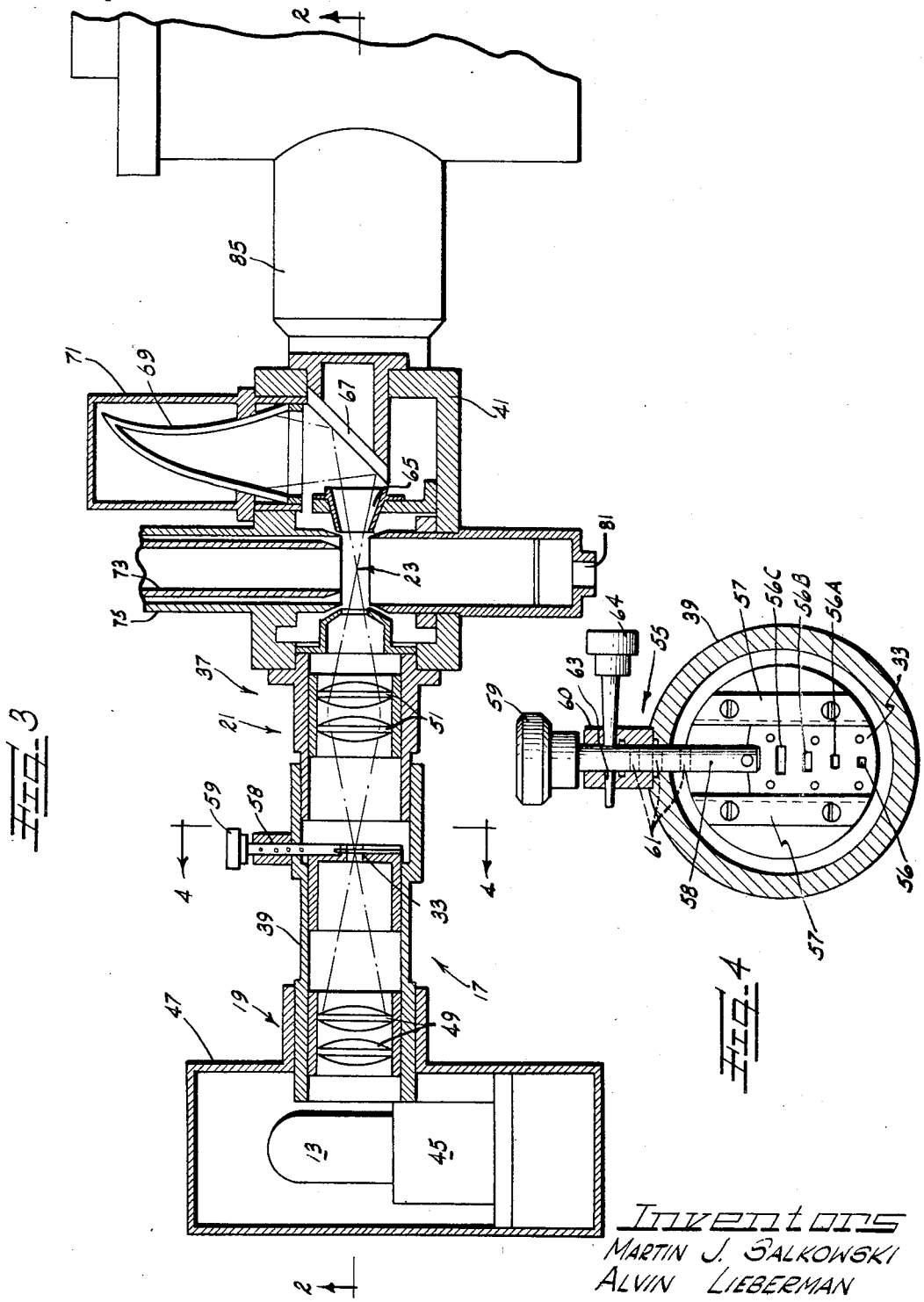
Inventors
MARTIN J. SALKOWSKI
ALVIN LIEBERMAN
By Anderson, Luedeka, Fitch, Even, & Tabin Attys.

United States Patent Office 3,504,183
Patented Mar. 31, 1970

3,504,183
PARTICLE COUNTER USING A VARIABLE TEST VOLUME
Martin J. Salkowski, Downers Grove, and Alvin Lieberman, Morton Grove, Ill., assignors to IIT Research Institute, Chicago, Ill., a nonprofit corporation of Illinois
Filed Sept. 12, 1966, Ser. No. 578,844
Int. Cl. G01n 21/36
U.S. Cl. 250—218                                    3 Claims

ABSTRACT OF THE DISCLOSURE

The concentration of particles suspended within a flowable medium is determined by projecting a light beam into the medium to define an illuminated volume therewithin. A reflected volume is also defined in the medium which intersects a portion of the illuminated volume to thereby define a coincident volume containing the portion of the medium to be sampled. The reflected light from the coincident volume is sensed to provide an output signal indicative of the particle concentration. The size of the coincident volume within the medium is selectively altered so that a predetermined number of particles are present, statistically, therewithin at rates which permit maximum statistical validity for the particle concentration determination provided by the sensing of the reflected light.

---

This invention generally relates to a method and apparatus for measuring the size and concentration of particles suspended within a flowable medium by optically defining a fixed volume within the medium and sensing light scattered from the particles suspended within the volume. More particularly, the invention relates to such an apparatus which further includes means for adjusting the size of the fixed volume so that particle concentrations may be accurately measured over relatively large variations in concentration.

The embodiment illustrated is generally adapted for measuring the size and concentration of particles suspended within a flowable medium, or more particularly, it is adapted for measuring the number concentration of an aerosol. The device illustrated receives a continuously flowing aerosol stream into which is projected a beam of light. A sensing means having a well defined receiving area is positioned generally perpendicular to the longitudinal axis of the light beam and collects the light scattered from a portion of particles within the volume of the light beam. In this regard, an increase in particle concentration produces a corresponding change in the output of the sensing means. In the operation of such an apparatus, it is desirable that light be scattered from only a single particle at a given time in order to eliminate errors which result if the light is scattered and rebounded from a large number of particles. Thus, when measuring an aerosol having a high particle concentration, only a relatively small volume of the aerosol should be sampled. Alternatively, if the particle concentration is low, such a small volume may provide inaccurate data since a relatively long period of time will necessarily lapse between the random positioning of aerosol particles within the volume in sufficient numbers to provide reliable data. Also, during such periods, the aerosol being sampled has an opportunity to change. In accordance with the present invention, the volume of the aerosol sampled is controlled so that only one particle is present, statistically, at repetition rates which will permit maximum statistical validity in describing the particle size distribution and concentration in the aerosol passing through the system. Prior systems for controlling the counting rate in accordance with the particle concentration have generally included means for mechanically diluting the aerosol before it is introduced into the sensing zone. Such dilution systems have many inherent disadvantages, such as, agglomeration, deposition upon the walls of the diluting apparatus, etc.

A main object of this invention is to provide a novel light scattering particle counter and method for measuring the particle concentration within a flowable medium more accurately than has been possible heretofore. A further object is to provide a particle counter including a means for varying the size of the volume sampled so as to obtain information having maximum validity. A still further object is to provide a light scattering particle counter for examination of large variations in particle concentration without mechanical manipulation of the flowable medium.

Other objects and advantages of the present invention will become apparent through reference to the following description and accompanying drawings, in which:

FIGURE 1 is a schematic diagram illustrating certain operational features of this invention;

FIGURE 2 is a full horizontal sectional view taken along the line 2—2 of FIGURE 3 and showing an apparatus embodying certain features of this invention;

FIGURE 3 is a full sectional view taken along the line 3—3 of FIGURE 2; and,

FIGURE 4 is an enlarged sectional view of a component of the apparatus taken along the line 4—4 of FIGURE 3.

Referring to the schematic diagram of FIGURE 1, an illuminating means in the form of a light bulb 13 is connected to a power supply 15 for energization thereof. The light from the bulb 13 is transmitted through an illuminating optic system 17 which comprises a condenser lens group 19 for condensing the light from the bulb filament and a projecting lens group 21. The optic system 17 projects a beam of light into a sensing zone 23, through which the aerosol stream flows continuously. The light scattered from a portion of the particles within the beam of light is collected by a receiving lens group 24 forming part of a receiving optic system 25 and reflected from a mirror 27 into a light sensing means in the form of a photo-multiplier tube 29. The photo-multiplier tube 29 is energized by a power supply 31 and the output of the tube 29 is connected to instruments (not shown) providing suitable information regarding the particle size distribution and concentration of the aerosol stream under consideration.

In accordance with the illustrated embodiment, means is provided for examining only a preselected volume within the sensing zone and varying the shape and size of such volume. This means includes an opaque generally planar illuminating plate 33 and a generally planar, opaque receiving plate 35 each of which is formed with a plurality of size graduated apertures. The illuminating plate 33 is positioned at the image focal plane of the condensing lens group 19 which is also the location of the object focal plane of the projecting lens group 21. Thus, the size of the image which forms the object of the lens group 21 is determined by the size and shape of the aperture of plate 33. This image passes through the projecting lens group 21 into the sensing zone 23 thereby defining an illuminated volume.

The longitudinal axis of the illuminating optic system 17 extends transversely of and in this instance is generally normal to the longitudinal axis of the receiving optic system 25. The receiving plate 35 with its apertures is located at the object focal plane of the receiving lens group 24 thereby limiting the cross sectional area of the volume within which the reflected or scattered light may be collected within the sensing zone and transmitted to the tube 29. The apertures of the receiving plate may thus be selected to define, within the illuminated volume, different fixed portions which may be termed reflected volumes within the sensing zone so as to obtain a specific dilution ratio of the aerosol stream. The illuminated volume and the reflected volume intersect within the sensing zone to form a well defined fixed coincident volume wherein the particle concentration of the aerosol is observed. Only that light scattered from those particles within the coincident volume will be collected by the receiving lens group 24 and projected onto the photo-multiplier tube 29.

The apparatus illustrated in FIGURES 2, 3 and 4 is constructed in accordance with the principles previously discussed and illustrated in FIGURE 1. Referring to FIGURE 2, the apparatus is enclosed within a housing 37 which may generally be divided into three compartments; namely, an illuminating tube 39, a sensing chamber 41 and a receiving tube 43. The light bulb 13 is screwed into a suitable socket 45 mounted within a reflecting enclosure 47 fixed to one end of the illuminating tube 39. The inner surface of the enclosure 47 may be coated with a reflective material to reflect the light towards the lens group 19. Mounted within the illuminating tube 39 which forms an optical bench for the illuminating optic system 17 is the condensing lens group 19 which includes four spatially positioned plano-convex lenses 49. The lenses 49 are arranged in pairs and the planar surfaces of each pair are parallel and spatially positioned. The lenses 49 are positioned so that the filament of the bulb 45 is in the object focal plane of the group 19, and the image thereof coincides with the position of the illuminating plate 33.

Positioned between the illuminating plate 33 and the sensing chamber 41 is the projecting lens group 21 which is constructed similarly to the condensing lens group 19 and includes four plano-convex lenses 51. The image defined by the illuminating plate 33 becomes the object of the lens group 21. This image is transmitted through the lenses 51 and light guide 53 into the sensing zone 23 of the aerosol chamber 41. An adjusting means 55 for positioning the plate with respect to the axis of the illuminating optic system 17 is provided.

As noted above, the illuminating plate 33 is formed with a plurality of size graduated apertures 56, **56*a*, 56*b*, and 56*c*, these apertures being rectangular in this instance. The plate is slidably supported between two parallel guides 57 which are secured to the walls of the tube 39. So that the position of the plate may be vertically adjusted between the guides 57, a vertical slide 58 having a positioning knob 59 at its upper end is secured at its lower end to the upper end of the plate. The slide is telescoped within a hollow tubular upright standard affixed to the illuminating tube 39. The slide 58 has a plurality of vertically spaced transverse holes 61 each of which is generally parallel to the upper edge of the plate 33. The holes are oriented so that they may be selectively aligned with a singular bore 63 which passes through the standard 59. The positioning knob is vertically shifted to align the selected aperture of the plate 33 with the axis of the illuminating lens systems 17 and the plate is secured in position with a locking pin 64 inserted through the bore 63 and the aligned hole 61 of the standard 60**.

As previously mentioned, the selected aperture of the illuminating plate 33 determines the size of the illuminated area which forms the object of the projecting lens group 21 and correspondingly the cross sectional area of the illuminated volume within the sensing area of the aerosol stream. The light beam after passing through the aerosol chamber 41 and a light guide 65 is reflected by a mirror 67 into an optical cornucopia or light trap 69 which prevents reflection of the transmitted light back into the aerosol stream. The light trap 69 is located in a housing 71.

The aerosol stream is introduced into a guide conduit 73 which is coaxially positioned within an upright cylinder 75 secured to aerosol chamber 41. The outer wall of the guide conduit 73 is spaced from the inner walls of the cylinder. In use, the aerosol is injected into the conduit 73 and clear air is forced into the space between the conduit 73 and the cylinder 75. As the air and the aerosol emerge into the sensing zone, the air stream forms a sheath about the aerosol stream thereby preventing contamination of the lenses, mirror and other parts of the apparatus. The aerosol strearm passes through the sensing zone and into the lower part of the chamber and is discharged through an orifice 81.

Light scattered or reflected by the particles within the aerosol stream is collected by the receiving lens group 24 mounted in the receiving tube 43 which is secured to the aerosol chamber 41. The lens group 24 comprises four plano-convex lenses 83 arranged in a manner similar to the condenser lens group 19 previously described. The receiving lens group 24 is adjusted so that the object focal plane thereof generally coincides with the light beam from the illuminating optic system 17. The axis of the group 24 intersects and herein is normal with the axis of the illuminating optic system 17. Light scattered from a portion of the illuminated particles within the aerosol stream is collected and projected onto the photo-multiplier tube 29. An enclosure 85 is provided and houses the power supplies 31, 15 and other equipment, such as a rate count meter, mechanical counter, printer etc., adapted for reading and recording the output from the tube 29.

Positioned at the image focal plane of the lens group 24 is the receiving plate 35 with its plurality of apertures which herein are rectangular. This plate is mounted in a manner similar to the illuminating plate 33 as described above for selectively positioning each of the apertures in alignment with the longitudinal axis of lens group 24. It is noted that, by the selection of a particular receiving aperture, the user determines the cross sectional area of the portion of the illuminated volume from within which light will be collected by the receiving optic system 25 and transmitted to the tube 29. This selection plus the selection of a particular aperture of the illuminating plate 33 thus determines the size of the coincident volume, that is, the volume formed by the intersection of the illuminated volume of the light beam and the reflected volume of the receiving lens system 25, thereby achieving the ready selection of a specific dilution rate.

In operation, the aerosol stream is introduced into the conduit 73 and clear air is injected into the space between the conduit 73 and the surrounding cylinder 75, the aerosol passing downwardly through the sensing zone 23. Just prior to introduction of the aerosol into the sensing zone, the clear air forms a sheath about the aerosol protecting the lenses and other parts of the apparatus. The filament of the bulb 13 is focused by means of the illuminating optic system 17 into the aerosol stream. The size of the selected aperture of the illuminating plate 33, usually the same size as the selected aperture of the receiving plate 35, determines the cross sectional area of the beam of light. Particles within the illuminated volume scatter and/or reflect light, a portion of which is collected by the receiving lens group 25 and projected through the aperture of the receiving plate 35 into the photo-multiplier tube 31. The aperture selected in this plate determines the cross sectional area of the volume wherein the scattered light will be collected. Thus, by selecting the aperture for both the plates 33 and 35, the size of the coincident volume and correspondingly the volume of the aerosol stream sample is selectively determined.

In the event that the aerosol stream under examination has a very high particle concentration, the smallest aperture of each of the plates is selected. Correspondingly, in the event a very low particle concentration is being considered, the largest aperture will be selected. Thus, there is provided an improved particle counter which is adapted for measuring the particle concentration within a flowable medium and which includes means for varying the sampled volume so that only one particle is present, statistically, at repetition rates which will permit maximum statistical validity in describing the characteristics of the aerosol regardless of the concentration being examined.

Although but one specific embodiment of this invention has been herein shown and described, it will be understood that details of the construction shown may be altered without departing from the spirit of this invention as defined by the following claims.

We claim:

1. An apparatus for measuring the concentration of particles suspended within a flowable medium, comprising an illuminating means, first means for projecting a beam of light into said medium so as to define an illuminated volume therein, light sensing means positioned near said medium, second means for directing light within a reflecting volume defined within said medium to said sensing means, a portion of said illuminated volume intersecting with said reflecting volume thereby defining a coincident volume wherein that portion of the medium to be sampled is located, means for selectively altering the size of said coincident volume so as to facilitate accurately measuring a wide range of particle concentrations, said first means including a condensing lens system for condensing the light rays of said illuminating means and a projecting lens system receiving the condensed light from said condensing lens system and projecting same in the form of a beam of light into said medium, said means for selectively altering the size of said coincident volume including a selectively variable aperture positioned between said condensing lens system and said projecting lens system so as to control the cross sectional area of the light beam forming the object of the projecting lens system to thereby control the cross sectional area of said illuminated volume and a second selectively variable aperture positioned between said medium and said sensing means so as to permit selective variation in the cross sectional area of said reflecting volume, said second means including a projecting lens system positioned between said medium and said second aperture for condensing and projecting the light reflected by the particles within said coincident volume through said second aperture and to said light sensing means, each of said apertures being one of a plurality of apertures of different sizes in a generally planar opaque plate having its plane positioned normal to the longitudinal axis of the associated one of said lens systems, and means for positioning said plates selectively to locate different ones of said apertures in alignment with the axes of said lens systems.

2. A method of measuring the concentration of particles suspended within a flowable medium, comprising the steps of causing said medium to flow through a confined space, projecting a controlled beam of light into said space so as to define an illuminated volume within said medium, defining a reflecting volume within the medium which intersects a portion of said illuminated volume to form a coincident volume containing the portion of the medium to be sampled, sensing the amount of light reflected from said coincident volume within the medium, and selectively altering the size of said coincident volume so that a predetermined number of particles are present, statistically, therewithin at rates which permit maximum statistical validity in determining the particle concentration in the flowable medium from the amount of reflected light sensed from said coincident volume.

3. The method of claim 2 wherein the size of said coincident volume is varied by varying the size of each of said illuminated volume and said reflected volume.

References Cited

UNITED STATES PATENTS

| | | | |
|---|---|---|---|
| 2,413,208 | 12/1946 | Barnes | 250—218 |
| 2,688,089 | 8/1954 | Williams | 250—218 |
| 2,935,909 | 5/1960 | Mathisen | 250—218 |
| 3,199,346 | 8/1965 | Stewart | 250—218 |
| 3,226,556 | 12/1965 | Rosin | 250—218 |
| 3,361,030 | 1/1968 | Goldberg | 250—218 |
| 3,382,762 | 5/1968 | Vasel et al. | 250—218 |

RALPH G. NILSON, Primary Examiner

C. M. LEEDOM, Assistant Examiner

U.S. Cl. X.R.

250—229, 237; 356—103, 146